Patented May 8, 1934

1,958,218

UNITED STATES PATENT OFFICE 1,958,218

CALCIUM HYDROXYETHYLPHENYLAMINO PARA SULPHONATE AND PROCESS OF PREPARING SAME

Clarence J. Treston, Philadelphia, Pa., assignor to Kloister Laboratories Corporation, Ephrata, Pa., a corporation of Pennsylvania No Drawing. Application June 4, 1932
Serial No. 615,470

5 Claims. (Cl. 260—129)

The invention is a composition of matter, comprising a novel chemical compound, or a mixture of that compound with other ingredients. The material of the present invention is useful particularly as a medicine for the treatment of coccidiosis in fowls and white diarrhea in chicks.

The chemical compound of the present invention is calcium hydroxyethylphenylamino para sulphonate, and is made in the following manner:

Sulphanilic acid is dissolved in water ($H_2O$) at 95° C.

To this solution calcium carbonate ($CaCO_3$) is added:

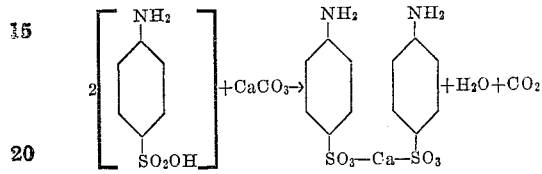

Calcium sulphanilate is separated by crystallization. These crystals are added slowly to ethylene chlorohydrin heated to 100° C., and the solution is agitated until the reaction is completed.

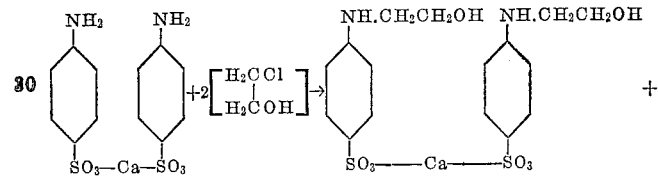

This reaction, as indicated in the equation given, produces calcium hydroxyethylphenylamino para sulphonate which is the novel chemical compound of the present invention, having marked medicinal value.

This chemical compound is most effective when mixed with beta naphthol as a remedy for coccidiosis of fowls and white diarrhea of chicks. Two parts by weight of this chemical compound or salt are preferably mixed with 48 parts of beta naphthol, and this combination has the desired remedial effect produced by neither alone.

It is not desired to limit the invention to the exact proportions given.

I claim:

1. Calcium hydroxyethylphenylamino para sulphonate.

2. The hereindescribed process comprising adding calcium carbonate to an aqueous solution of sulphanilic acid, forming calcium sulphanilate crystals, adding the crystals to ethylene chlorohydrin with heat and agitation to complete the reaction forming calcium hydroxyethylphenylamino para sulphonate.

3. A process for preparing calcium hydroxyethylphenylamino para sulphonate comprising the steps of treating sulphanilic acid solution with calcium carbonate, forming calcium sulphanilate, and treating the calcium sulphanilate with ethylene chlorohydrin.

4. A process comprising dissolving sulphanilic acid in water at approximately 95° C., adding calcium carbonate, separating calcium sulphanilate by crystallization, slowly adding the crystals to ethylene chlorohydrin heated to approximately 100° C. and agitating the solution until the reaction is completed forming calcium hydroxyethylphenylamino para sulphonate.

5. A process for preparing calcium hydroxyethylphenylamino para sulphonate comprising treating sulphanilic acid solution at about 95° C. with calcium carbonate, forming calcium sulphanilate crystals, and treating the crystals with ethylene chlorohydrin heated to about 100°.

CLARENCE J. TRESTON.